United States Patent
Shorney

(10) Patent No.: US 9,638,052 B2
(45) Date of Patent: May 2, 2017

(54) SEALING ARRANGEMENT FOR A GAS TURBINE ENGINE

(71) Applicant: ROLLS-ROYCE PLC, London (GB)

(72) Inventor: Andrew Shorney, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 14/924,165

(22) Filed: Oct. 27, 2015

(65) Prior Publication Data

US 2016/0130966 A1   May 12, 2016

(30) Foreign Application Priority Data

Nov. 6, 2014 (GB) .................................. 1419766.9

(51) Int. Cl.
  *F16J 15/447* (2006.01)
  *F01D 11/02* (2006.01)
  *F04D 29/10* (2006.01)

(52) U.S. Cl.
  CPC ............ *F01D 11/02* (2013.01); *F04D 29/102* (2013.01); *F16J 15/447* (2013.01); *F05D 2220/32* (2013.01); *F05D 2240/55* (2013.01)

(58) Field of Classification Search
  CPC .... F16J 15/447; F16J 15/4472; F16J 15/4474; F01D 11/02; F01D 11/04; F01D 11/06; F05D 2220/32; F05D 2240/55
  See application file for complete search history.

(56) References Cited

U.S. PATENT DOCUMENTS

| 5,961,279 | A * | 10/1999 | Ingistov | F01D 11/001 277/412 |
| 7,559,554 | B2 * | 7/2009 | Hogg | F01D 11/02 277/412 |
| 2008/0066444 | A1 | 3/2008 | Cornelius et al. | |
| 2011/0280715 | A1 * | 11/2011 | Garg | F01D 11/001 415/174.5 |
| 2014/0241857 | A1 | 8/2014 | Chuong et al. | |

FOREIGN PATENT DOCUMENTS

| EP | 1921276 A2 | 5/2008 |
| EP | 2538030 A1 | 12/2012 |
| GB | 1270959 A | 4/1972 |
| GB | 2111598 A | 7/1983 |
| WO | 2010/129189 A1 | 11/2010 |

OTHER PUBLICATIONS

Mar. 25, 2015 Search Report issued in British Patent Application No. GB1419766.9.
Mar. 29, 2016 Search Report issued in European Patent Application No. 15191592.3.

* cited by examiner

*Primary Examiner* — Gilbert Lee
(74) *Attorney, Agent, or Firm* — Oliff PLC

(57) ABSTRACT

There is described a seal assembly for a gas turbine engine comprising: a first seal having a sealing passage which defines a flow path trajectory for leakage air, the first seal for partitioning a first pressure area to a lower pressure area; a second seal located along the line of the flow path trajectory of the first seal, the second seal for partitioning a second pressure area and the lower pressure area; a deflection member located between the first seal and second seal, and in the trajectory of the flow path from the first seal.

17 Claims, 2 Drawing Sheets

SEALING ARRANGEMENT FOR A GAS TURBINE ENGINE

TECHNICAL FIELD OF INVENTION

The present invention relates to a sealing arrangement for a gas turbine engine.

BACKGROUND OF INVENTION

FIG. 1 shows a ducted fan gas turbine engine 10 comprising in axial flow series: an air intake 12, a propulsive fan 14 having a plurality of fan blades 16, an intermediate pressure compressor 18, a high-pressure compressor 20, a combustor 22, a high-pressure turbine 24, an intermediate pressure turbine 26, a low-pressure turbine 28 and a core exhaust nozzle 30. A nacelle 32 generally surrounds the engine 10 and defines the intake 12, a bypass duct 34 and a bypass exhaust nozzle 36. The engine has a principal axis of rotation 31.

Air entering the intake 12 is accelerated by the fan 14 to produce a bypass flow and a core flow. The bypass flow travels down the bypass duct 34 and exits the bypass exhaust nozzle 36 to provide the majority of the propulsive thrust produced by the engine 10. The core flow enters in axial flow series the intermediate pressure compressor 18, high pressure compressor 20 and the combustor 22, where fuel is added to the compressed air and the mixture burnt. The hot combustion products expand through and drive the high, intermediate and low-pressure turbines 24, 26, 28 before being exhausted through the nozzle 30 to provide additional propulsive thrust. The high, intermediate and low-pressure turbines 24, 26, 28 respectively drive the high and intermediate pressure compressors 20, 18 and the fan 14 by concentric interconnecting shafts 38, 40, 42.

As will be appreciated, there is a need to compartmentalise the various sections of the engine so as to maintain the desired pressurised flow paths. The better this can be done, the more efficient the engine stands to be. However, the main gas path and inner core of the engine are made up from numerous parts which rotate relative to one another so sophisticated sealing technologies are required to seal between the relative rotating parts.

Conventional gas turbine engines employ many different types of seals at different locations throughout the engine. Such seal types include non-contacting, contacting, air riding or compliant seals.

A well utilised seal is a labyrinth seal. A labyrinth seal typically comprises a static part and a rotating part which are separated so as to be non-contacting in normal use. The rotating part includes a cascade of projecting annular fins which extend towards the static part. The opposing static part may include abradable portions which face the tips of the fins and preferentially abrade in favour of the fins if there is contact in use. Thus, the operating tolerance of the separating gap can be safely reduced to a minimum without fear of damaging the fins.

Labyrinth seals, as well as many other seals, exit a jet of air from the last fin in the cascade. The present invention seeks to provide an improved sealing arrangement.

STATEMENTS OF INVENTION

The present invention provides a seal assembly according to the appended claims.

In a first aspect, the seal assembly is for a gas turbine engine and comprises: a first seal having a sealing passage which defines a flow path trajectory for leakage air, the first seal for partitioning a first pressure area to a lower pressure area; a second seal located along the line of the flow path trajectory of the first seal, the second seal for partitioning a second pressure area and the lower pressure area; a deflection member located between the first seal and second seal, and in the trajectory of the exit flow path from the first seal.

The deflection member may be a fin. The fin may extend from a rotating part or a static part. The deflection member may be annular.

The first pressure area may be a higher pressure area. The second pressure area may be an intermediate pressure area.

The deflection member may be inclined in a downstream direction. The deflection member extends into the exiting flow path of the first seal. The deflection member may project from one side first seal exit to the other side of the first seal exit.

The low pressure area may be contained within a low pressure chamber which includes an exit aperture in a wall thereof. The deflection member may be positioned between the exit of the first seal and the exit aperture of the low pressure chamber.

The positioning of the deflection member may block the line of sight between the exit of the seal and the exit aperture.

The low pressure chamber may be bounded by at least one wall located opposite the exit aperture. The deflection member may be angled to direct the flow towards the at least one wall and away from the exit aperture.

A second deflection member may be located downstream of the second seal. The first and second deflection members may be axially spaced from one another.

The second deflection member may be located on the at least one wall which opposes the exit aperture.

The second deflection member may be angled away from the opposing wall such that the longitudinal axis of the wall points towards the exit aperture.

The first and second deflectors may combine to provide a meandering flow path extending between the first seal exit and the exit aperture of the low pressure chamber. The meandering flow path may be chicane or s-shaped. Thus, the flow path includes first bend which turns the flow away from the exit aperture and towards a second turn. The second turn redirects the flow towards the exit aperture.

The first seal may be a labyrinth seal. The second seal may a labyrinth seal.

DESCRIPTION OF DRAWINGS

Embodiments of the invention will now be described with the aid of the following drawings of which.

DETAILED DESCRIPTION OF INVENTION

Figure 1:
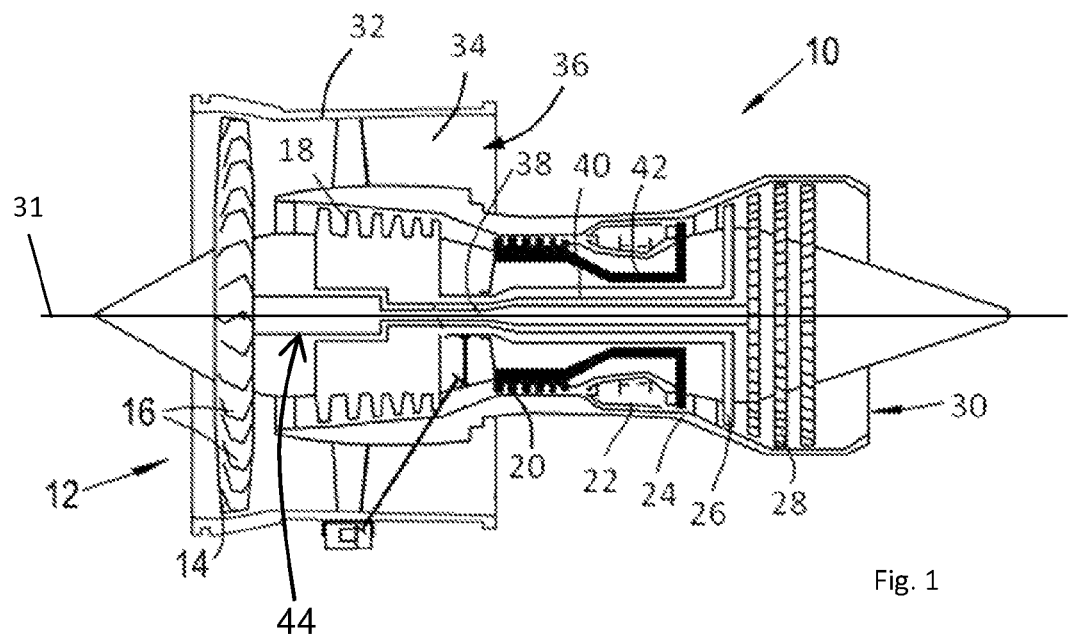
FIG. 1 shows a longitudinal cross-section of a conventional gas turbine engine.
Figure 2:
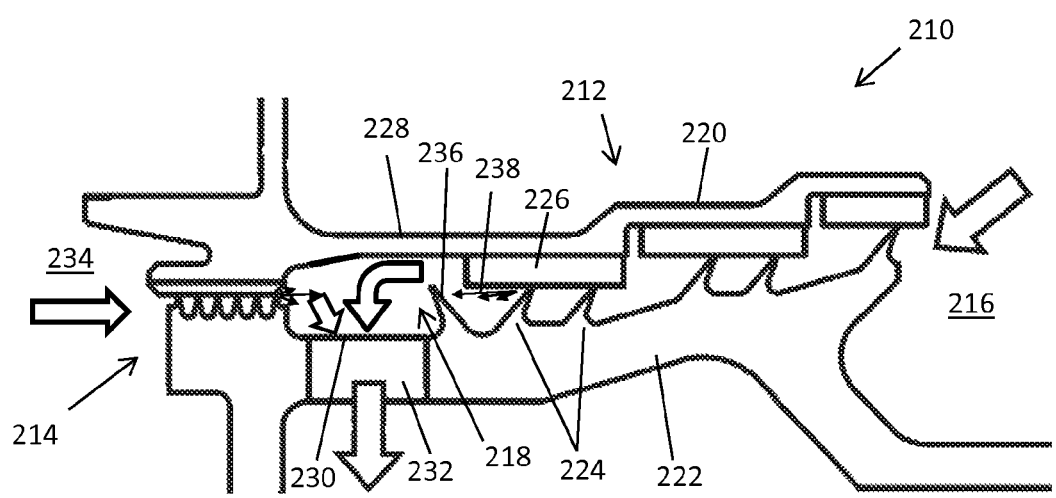
FIG. 2 shows a schematic longitudinal cross-section of a seal assembly of the present invention.

FIG. 2 shows a longitudinal cross-section of a seal arrangement 210 according to the present invention. The seal arrangement includes a first seal 212, in the form of a stepped labyrinth seal, and a second seal 214, in the form of a straight labyrinth seal, which are arranged in opposing flow directions.

The first seal 212 is located between a high pressure area 216 and a low pressure area 218 and includes a static part 220 and a rotating part 222. The rotating 222 and static 220 parts are radially separated to provide an annular shoot therebetween. The shoot extends axially and radially inwards so as to have a generally conical trajectory around the engine. The first seal 212 includes three stages which are axially and radially offset to one another along the length of the shoot. Each stage includes one or more fins 224 or teeth which extend from lands on the rotating part 222. The fins 224 extend towards corresponding abradable portions 226 on the static part 220 and are inclined upstream towards the high pressure side of the seal. The fins 224 are annular and elongate in longitudinal section with a tapered profile which narrows towards the distal end.

The low pressure area 218 is bounded by a radially inner 230 and radially outer 228 wall to form a chamber. The walls are continuations of the walls which define the first seal shoot. An exit aperture 232 for the low pressure air to flow out from the low pressure chamber is located in the radially inner wall 230.

The opposing end of the low pressure chamber 218 relative to the first seal, there is a second seal 214. The second seal 214 is also a labyrinth seal in the form of a stepped labyrinth. The second seal 214 partitions an intermediate pressure area 234 from the low pressure area 218.

The first 212 and second 214 seal include sealing interfaces between the fins and corresponding static parts which define an imaginary axis which represents a general trajectory for the leakage flow through the seals. In FIG. 2, the general flow exit trajectory of the first seal 212 is towards the second seal 214, and vice versa. Thus, air exiting the seals will be directed generally towards the opposing seal. The flow trajectory of the seal in the described embodiment is determined by the flow past the sealing fins. It will be appreciated that the exit flow trajectory of other fins may vary due to the architecture of the seals, but will be known by the person skilled in the art of air seals.

The exit aperture 232 for the low pressure chamber is placed in an orthogonal relation to the exiting flow trajectories meaning that the flow must turn through ninety degrees before being exited from the chamber 218.

The high, intermediate and low pressures referred to in the embodiments are used in a relative sense. Hence, the high and intermediate pressure areas are at a higher pressure than the low pressure area and there is an expected dominating flow from the relative higher pressure areas to the low pressure areas. Typically, the air within the high pressure area will be provided by a stage of the high pressure compressor or one of the latter intermediate pressure compressor stages, with the intermediate pressure being provided by a stage of the intermediate pressure compressor, but this will vary upon application.

It is well known that air exiting a non-contacting seal can form a powerful jet. The specific flow pattern of the jet is difficult to predict, but it can be assumed that the bulk trajectory of the jet will generally be in-line with the sealing interface. Thus, as shown in FIG. 2, the flow of air 238 exiting the first seal 212 is a jet predominantly directed away from the seal with a general trajectory more or less in line with the axial flow path through the seal 212. Thus, if not disrupted or deflected in some way, the exiting flow would traverse the low pressure chamber 218 towards the second seal 214.

Due to the difference in the pressure being regulated by the first 212 and second 214 seals, there is generally a greater potential for the air exiting the first seal 212 to be of a considerably higher velocity than the air exiting the second seal 214. In some operating conditions the velocity difference is potentially enough to disrupt or even reverse the flow exiting the second seal 214.

The described arrangement provides a deflection member in the form of a fin 236 at the downstream end of the first seal 212 which is located in the trajectory of the flow path of the air 238 exiting the final stage of the first seal 212. Hence, the deflector fin 236 extends from a wall of the low pressure chamber on one radial side of the first seal to the other radial side of the first seal so as to cross the exit flow path trajectory. The deflector fin 236 is located on the rotating part 222 of the first seal and adjacent to the exit aperture such that the line of sight between the flow exit from the first seal and the exit aperture of the low pressure chamber is blocked by the deflector fin 236. Additionally, the deflector fin 236 is angled away from the flow path in a downstream direction and acts to redirect the flow exiting the first seal away from the first seal 212 towards the outer wall of the low pressure chamber and away from the exit. The deflector fin 236 is tapered in a similar manner to the seal fins 224 described above.

The inclination of the deflector fin is the same but in axial opposition to the seal fins. Hence, the deflector fin points axially downstream whereas the seal fin points upstream to aid sealing. Thus, the deflector fin and seal fin are substantially symmetrical about a plane which is normal to the axis of rotation so that the two components form a V-shape in section. The angle of the fins may be any appropriate respective angle for the sealing requirements and architecture of the engine. Thus, the angle of the deflector fin may be shallower if the exit aperture for the chamber is axially spaced further from the downstream end of the seal. It is envisaged that the angle of the deflector fin will be between approximately 45 and 65 degrees.

Figure 3:
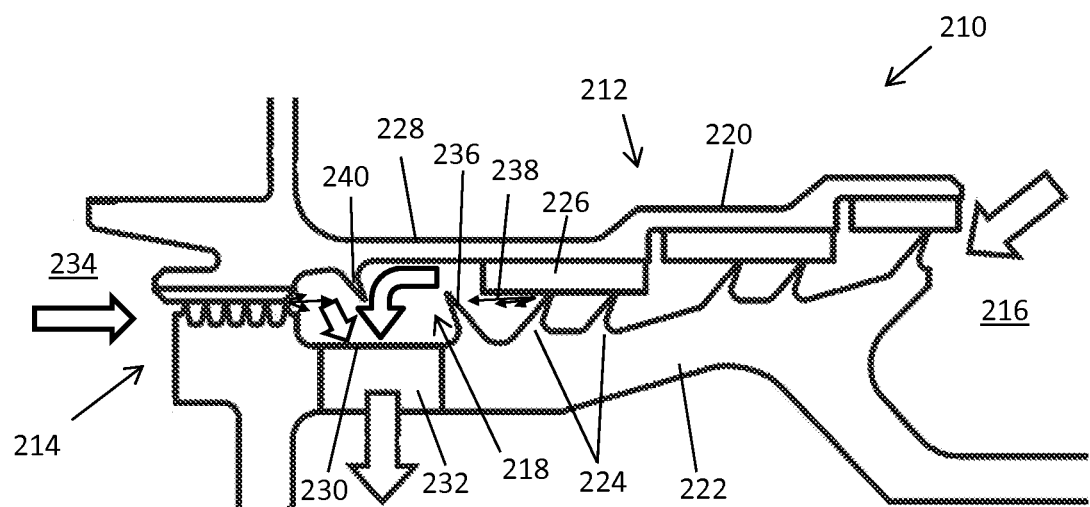
FIG. 3 shows a modification to the seal assembly shown in FIG. 2.

In the example shown in FIG. 3, there is a sealing arrangement in which the features and reference numerals correspond with those of FIG. 2. In addition there is provided a second deflector fin 240 located adjacent the second seal 214 exit. The deflector fin 240 extends from a wall of the low pressure chamber on one radial side of the second seal to the other radial side of the second seal so as to cross the exit flow path trajectory. The deflector fin 240 is located on the static part 222 of the low pressure chamber and radially opposite the exit aperture. The deflector fin 240 is angled away from the flow path in a downstream direction towards the first seal 212 exit and exit aperture 232 and acts to redirect the flow exiting the second seal towards the exit aperture 232. The deflector fin 240 is tapered in a similar manner to the seal fins 224 described above.

The angling of the second deflector fin 240 helps turn the flow exiting the second seal but also provides a flow obstruction for the air which has been deflected by the first deflector fin 236. Thus, in combination, the first and second deflector fins provide a meandering, S-shaped or chicane flow path for the air. The flow path includes a first bend which turns the flow away from the exit aperture and towards a second turn. The second turn redirects the flow towards the exit aperture. More specifically, the meandering flow path starts at the exit of the first seal before being turned by the first deflector fin to have a trajectory towards the exit opposing wall and the second deflector fin. The second deflector fin then turns the flow towards the exit aperture where it mixes with the exit flow from the second seal in a substantially parallel flow path which is less disruptive to the second seal exit flow.

While the invention has been described in conjunction with the examples above, many equivalent modifications and variations will be apparent to those skilled in the art when given this disclosure. Accordingly, the examples set forth above are considered to be illustrative and not limiting and various changes to the described embodiments may be made without departing from the spirit and scope of the invention. For example, although the examples above relate to axially separated and opposing seals, it is possible that the seals could be radially separated and opposing. In this case, references to radial and axial set out above may become interchanged. Further, although the seals are shown as having exit flow trajectories which directly oppose one another, the invention may find benefit where one of the flow trajectories is not towards the exit of another seal. The sealing arrangements described above can be utilised any suitable location in a gas turbine engine and are not confined to a particular location or purpose.

The invention claimed is:

1. A seal assembly between static and rotating parts of a gas turbine engine comprising:
   a first seal formed as a labyrinth seal having one or more fins extending between the stator and rotor to a seating interlace which defines a sealing passage and a flow path trajectory for leakage air exiting the seal along an exit flow path, the labyrinth seal for partitioning a first pressure area and a lower pressure area;
   a second seal located along a line of the flow path trajectory of the first seal, the second seal for partitioning a second pressure area and the lower pressure area;
   a first deflection member downstream of the labyrinth seal relative to the leakage air exiting the first seal and extending between the rotor and stator, the first deflection member being located between the first seal and the second seal, and traversing the exit flow path from the first seal, wherein the separation between the deflection member and opposing static part or rotating part is greater than a separation of the sealing interface.

2. The seal assembly as claimed in claim 1, wherein the first pressure area is a higher pressure area and the second pressure area is an intermediate pressure area.

3. The seal assembly as claimed in claim 1 wherein the first deflection member is inclined in a downstream direction.

4. The seal assembly as claimed in claim 1, wherein the low pressure area is contained within a low pressure chamber which includes an exit aperture in a wall thereof.

5. The seal assembly as claimed in claim 4, wherein the first deflection member is positioned between the exit of the first seal and an exit aperture of the low pressure chamber.

6. The seal assembly as claimed in claim 4, wherein the low pressure chamber is bounded by at least one wall located opposite the exit aperture, and the first deflection member is angled away to direct the flow towards the at least one wall and away from the exit aperture.

7. The seal assembly as claimed in claim 4, wherein the first seal and the second seal are on opposing sides of the lower pressure chamber and the flow path trajectories of the first and second seals enter the lower pressure chamber in opposing directions.

8. The seal assembly as claimed in claim 1, wherein a second deflection member is located downstream of the second seal.

9. The seal assembly as claimed in claim 8, wherein the low pressure chamber which includes an exit aperture in a wall thereof and is further bounded by at least one wall located opposite the exit aperture and wherein the second deflection member is located on the at least one wall located opposite the exit aperture.

10. The seal assembly as claimed in claim 9, wherein the second deflection member is angled away from an opposing wall such that a longitudinal axis of the opposing wall points towards the exit aperture.

11. The seal assembly as claimed in claim 9, wherein the first and second deflection members combine to provide a meandering flow path extending between the first seal exit and the exit aperture of the low pressure chamber.

12. The seal assembly as claimed in claim 1, wherein the first seal is a labyrinth seal.

13. The seal assembly as claimed in claim 1, wherein the second seal is a labyrinth seal.

14. The seal assembly as claimed in claim 1, wherein the first and second seals include a sealing interface between the rotating and static parts, and a bulk flow path trajectory is in-line with the sealing interface.

15. The seal assembly as claimed in claim 14, the sealing interface defining an imaginary axis which generally defines the flow seal trajectory.

16. The seal assembly as claimed in claim 1, wherein the direction of the first flow path trajectory is towards the second seal, and the second seal flow path trajectory is towards the first seal.

17. A seal assembly between rotating parts and static parts of a gas turbine engine, the seal assembly comprising:
   a first seal having a sealing passage which defines a flow path trajectory for leakage air, the first seal including all interfaces between the rotating parts and static parts that partition a first pressure area and a lower pressure area;
   a second seal located along a line of the flow path trajectory of the first seal, the second seal including all interfaces between the rotating parts and static parts that partition a second pressure area and the lower pressure area;
   a first deflection member located between the first seal and the second seal, and extending transverse to a trajectory of an exit flow path from the first seal, the first deflection member not having an interface between the rotating parts and static parts.

* * * * *